Feb. 20, 1923.
R. M. ROBINSON ET AL
1,445,715
FLYWHEEL GOVERNOR
Filed Mar. 9, 1921
3 sheets-sheet 1
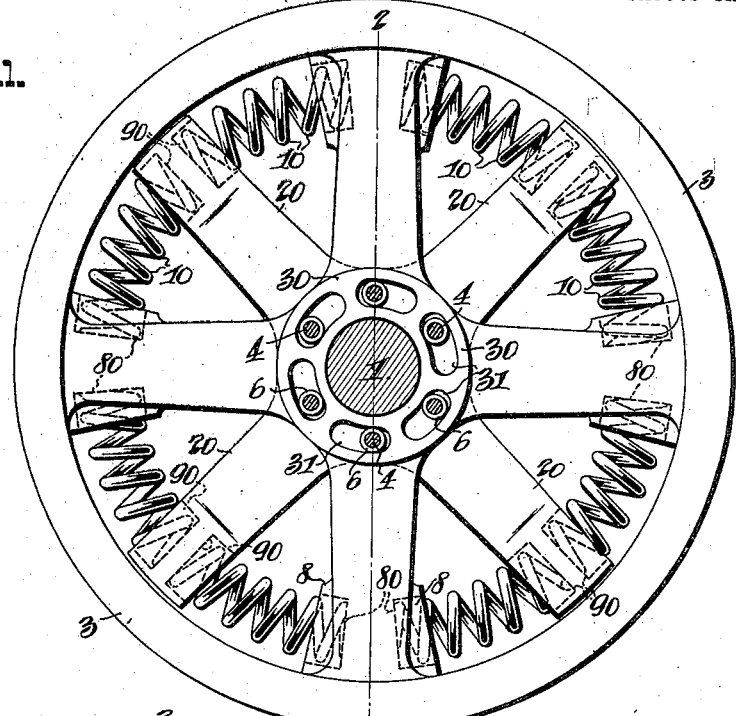
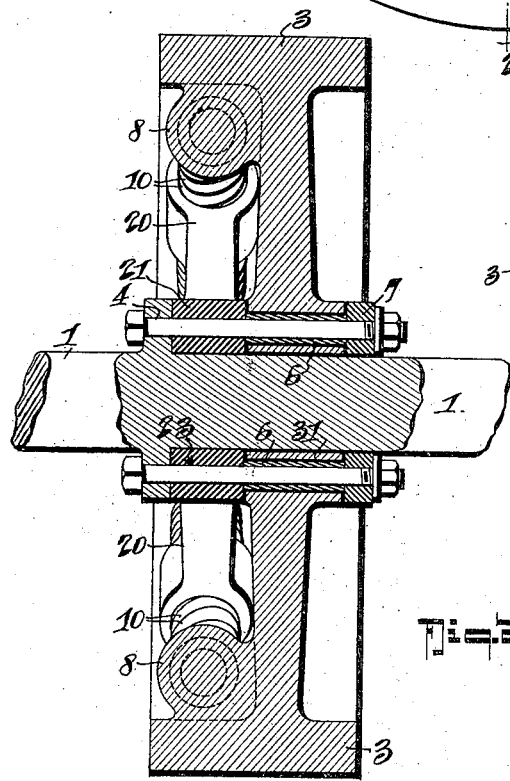
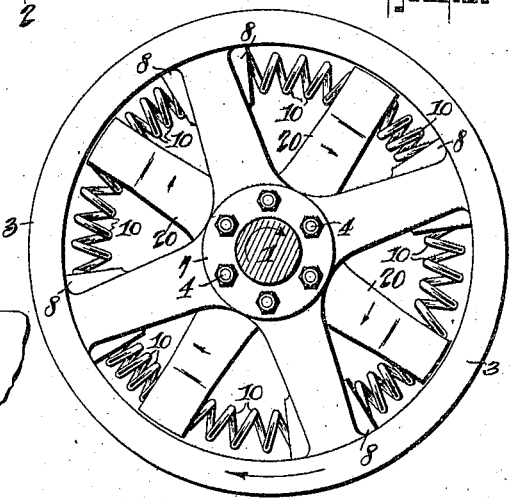
INVENTOR
Roy M. Robinson,
James Bradley.
BY
H. Winship Wheatley
ATTORNEYS

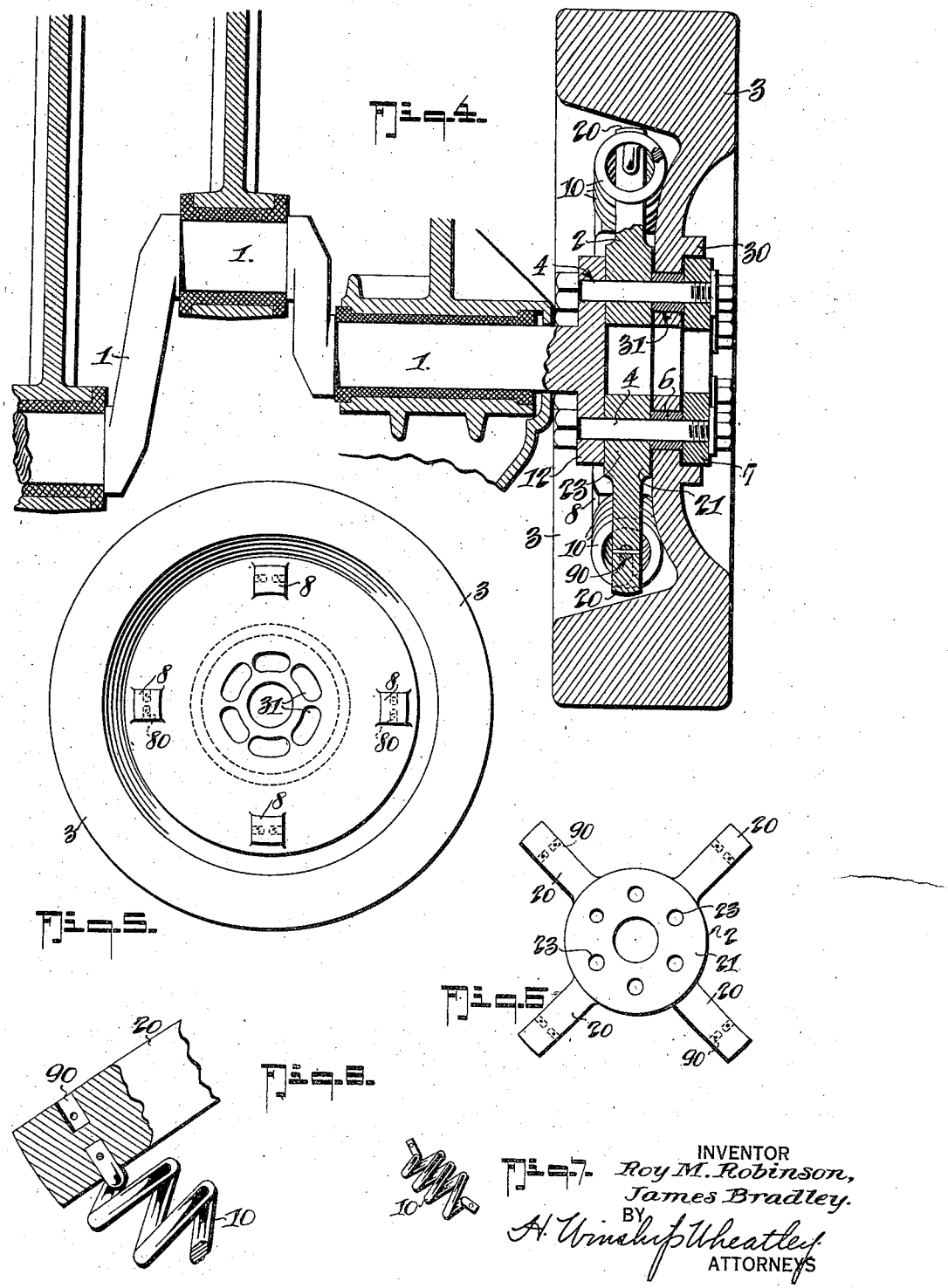

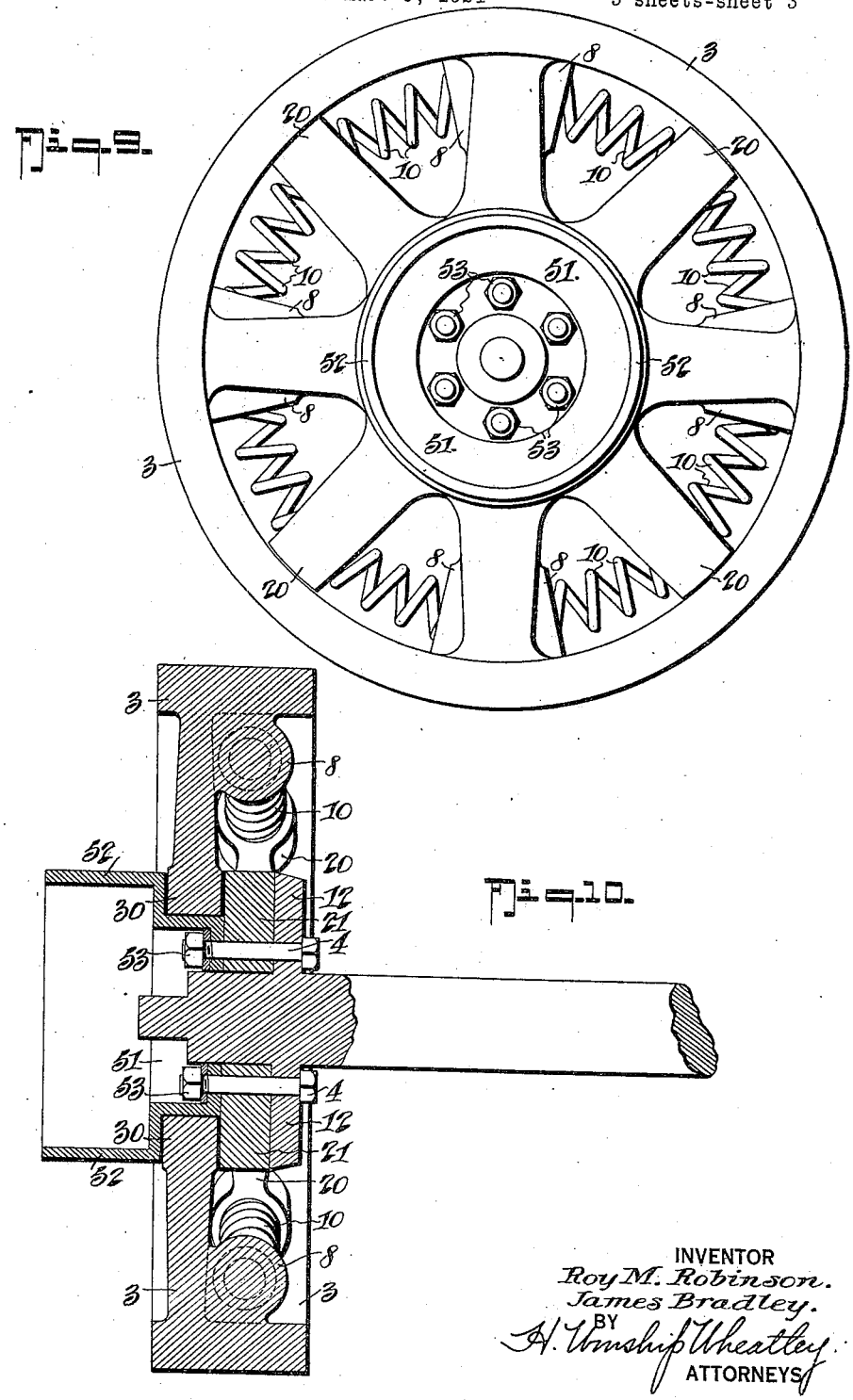

Patented Feb. 20, 1923.

1,445,715

UNITED STATES PATENT OFFICE.

ROY M. ROBINSON AND JAMES BRADLEY, OF ALBANY, NEW YORK, ASSIGNORS OF ONE-FOURTH TO JOHN L. MALLETT AND ONE-FOURTH TO HARRY WALTER LEE, OF ALBANY, NEW YORK.

FLYWHEEL GOVERNOR.

Application filed March 9, 1921. Serial No. 450,985.

*To all whom it may concern:*

Be it known that we, ROY M. ROBINSON and JAMES BRADLEY, citizens of the United States, residing at Albany, in the county of Albany and State of New York, have invented a new and Improved Flywheel Governor, of which the following is a specification.

This invention has for its purpose to provide a new and improved rotative member which, when used in connection with automotive vehicles, takes the place of the usual fly wheel on the rear end of the crank or power shaft and constitutes a flexible connection between the engine and its power application, like a transmission on a motor car power unit.

Another and essential feature of this invention is the provision of a fly wheel governor adapted for delivering or transmitting power to machinery in factories, in such manner whereby as in starting individual machines from a power line of shafting the said rotative or fly wheel governor provides a flexible means for taking up the load and imparting transmission without jerk or slipping of belts or placing excessive strain on the same.

As is well known, motor cars possess, more or less, erratic clutch engagement, also vibration periods during rotation of the crank shaft, which are caused by uneven pulsations, due to the difference in power impulses of the several cylinders of the motor, which vibrations have not as yet, so far as we know, been satisfactorily overcome.

This invention, among other purposes, is designed to eliminate the disadvantages mentioned and it embodies a simple, relatively economical construction of parts that present a practical means, useful as a pulley for transmission of power, for providing an efficient flexible coupling between a direct connected engine or motor and electric dynamo or generator, or in connection with an aeroplane propeller and its driving power, to take up the unequal thrusts of the blades as well as vibration.

With other minor objects in view, hereinafter apparent, this invention is a combined fly wheel governor and vibration compensator, that embodies the peculiar features of construction and novel combination of parts fully explained in the following detailed description, as specifically stated in the appended claims and illustrated in the accompanying drawings, in which:

Figure 1 is a detail side elevation, parts being in section, illustrating the application of our invention in an ordinary line shaft pulley.

Figure 2 is a detail vertical cross section thereof on the line 2—2 on Figure 1.

Figure 3 is a detail side elevation, parts being in section, of the wheel shown in Figure 1, the parts being in the shock take up or operative position.

Figure 4 is a detail longitudinal section illustrating our invention as embodied in an ordinary type of internal combustion engine fly wheel.

Figure 5 is a detail face view of the fly wheel, per se, as shown in Figure 4.

Figure 6 is a similar view of the spider member that cooperates therewith, and

Figures 7 and 8 are detail elevations and part sections of one of the spring elements and its connection to the spider arms as hereinafter explained.

Figure 9 is a face view.

Figure 10 is a vertical section of a modified form of our invention hereinafter specifically referred to.

When applied as shown in Figure 4, our invention is built into or takes the place of the usual fly wheel on the rear end of the crank shaft, usually located under the foot or dash board, and it constitutes a flexible connection between the engine and its power application, like a transmission in a motor car.

The drawings illustrate a practical development of our invention, and referring to the same, in which like numerals of reference indicate like parts in all of the figures, 1 designates a motor driven crank shaft, and 2 a spider frame that includes radial arms 20 and a suitable hub 21 which surrounds the crank shaft and which furnishes the mount or axle for the balance wheel 3 (hereinafter referred to) to ride on or float and rotate a predetermined distance. While the spider frame is described and shown as being an attached part of the shaft it is to be understood that for some purposes it may be more desirable to form the spider frame as an integral part of the shaft.

The balance or governor wheel 3, before referred to, is of the usual form, and it has a hub portion 30 formed with a series of concentrically disposed elongated slots 31, through each of which is passed a bolt 4, the latter, when assembling the parts, also passing through a series of apertures 23 in the hub portion of the spider frame. The several bolts 4 engage bushings 6 of a trifle greater length than the thickness of the balance wheel hub, so that as the bolts go through an outer or plain flange plate 7, the balance wheel 3, the driving spider frame 2 and a retaining flange 12, that is integral with the crank shaft, and are drawn up tight, the said bushings will leave some space between the retaining plate or flange 7 on the crank shaft and the spider frame, to leave the balance wheel free to move either way, rotatively, a distance determined by the resistance of the cushioning elements hereinafter mentioned, and to press against the spider frame, thereby making it, as it were, solidly fastened to the crank shaft flange by the use of the original number of bolts required to bolt the conventional fly wheel to the crank shaft flange.

At the junction of the radial arms of the fly wheel and the rim thereof, the said arms are cast with or have fixedly attached thereto, abutments 8 extending circumferentially at each edge of the wheel arms 30 and each of the end faces of the said abutments 8 has a socket or seat 80.

The outer ends of the arms of the spider frame are provided with sockets 90—90.

A series of stout coiled spiral compression springs 10 provide the flexible connection between the crank shaft, through its attached spider frame and the wheel 3, and one of the said springs is disposed between each of the opposite edges of the spider arms and their adjacent abutments 8 on the wheel 3, the said springs being firmly held to their operative position by reason of their ends seating within the sockets 80—90, as shown.

Instead of providing sockets 80—90 in the wheel and spider arms, respectively, as described and shown in Figures 1, 2 and 3, the ends of the springs may be terminated as shown in Figures 4, 7 and 8, and to adapt them for being pin connected with their respective arms 20 and the wheel spokes or arms, as indicated in Figures 4 and 8.

From the foregoing taken in connection with the drawings, the complete construction, the manner of use and the advantages of this invention will be readily apparent to those familiar with the use of power driven vehicles and transmission.

It is noted the combined fly and governor wheel provide flexible means of taking up the load, the jerk or the slipping of belts or the placing of excessive strain on the same.

Our flexible connecting means can be readily applied on any of the common types of transmission pulleys. By its use an extra smooth and velvety clutch action is obtained, as the grab is taken up by the spring connection on the reverse side of the power springs, being those doing the driving, indicated as being under compression in Figure 3.

Our improvements are of exceedingly simple arrangement that need no adjustments after installation, the cost of manufacture of which is simple, and whose parts are so designed and combined that a practical and stable mechanism for the purpose mentioned is provided.

It is understood that while the specific details of construction shown and described illustrate a practical development of our invention we do not limit our invention to the precise details of construction shown and described since the same may be readily modified or varied to suit the different machines, automobiles, aeroplanes, submarines, pulleys, etc. for which our invention may be especially adapted, without departing from the generic features of our said invention and as particularly come within the scope of the appended claims.

While we have specifically described and illustrated compressor springs as a cushioning element between the rotor (spider frame) and the floating pulley or wheel, we desire it understood that we do not restrict ourselves to the cushioning means shown and described since the said cushioning elements might be oil, water, air, or other media; when oil, air or water is used, the opposing portions of the spider arms and the pulley spokes are especially constructed to adapt them for the application of such cushioning media.

Furthermore, in the broad application of our invention the same is not restricted to the use of the elongated slots or the bushings in the hub or balance wheel since the same results, that of providing a flexible or cushioning clutch connection between the balance or fly wheel 3 and the spider frame 2 may be made without the use of the said elongated slots and the bushings and in various ways, for example, as shown in Figures 9 and 10, which illustrate a modified form in the invention.

In the said modified form of our invention, the parts are especially designed for connection with the wheel 3 when it is to be used as a floating balance wheel to absorb vibration and balance the impulses of an automotive type of piston motor.

In the said modified form, the spider frame 2 is secured to the shaft flange 12, as before, but the bolts 4 do not pass through the wheel hub but through a hub portion 51 of a clutch housing 52 and to which housing portion 52 the bolts are made fast by the nuts 53, as is clearly shown in Figure 10, which illustrates the hub portion 51 with an axial opening through which the end of the power driven shaft 1 passes, the latter in the modified construction shown having an extension adapted for receiving a ball bearing for supporting a disk clutch of suitable design (not shown).

In the said modified showing of our invention, the wheel 3 is floatably mounted on the hub portion 51 and in the practical arrangement the said wheel and the driving spider are flexibly connected by any suitable cushioning means so that the said balance wheel 3 absorbs and balances the impulses imparted to the shaft 1.

What we claim is:

1. In combination with a crank shaft of an engine, said shaft having a flange, a spider member having a hub portion, a fly wheel having a web with a central aperture, a member also centrally apertured, between which member and the hub portion of the spider said web of the fly wheel is located, bolts passing through apertures in said member, said fly wheel web, said spider hub and said flange with nuts for fixedly securing said spider and said member to said flange with the axes of said spider, said fly wheel and said member coincident with the axis of said shaft, spacers on said bolts between said spider hub and said member, said fly wheel web having elongated apertures to receive said spacer member whereby said fly wheel may be turned in either direction around its axis, and shock absorbing springs connecting said fly wheel with said spider, substantially as shown and described.

2. In combination with a shaft having a flange and a bearing surface adjacent thereto, a spider including a hub mounted on said surface adjacent to the flange, a wheel including a hub rotatable around the shaft adjacent to said spider, a member engaging said wheel hub at the side opposite to said spider hub, means for securing said member and said spider hub to said flange to hold said spider rigidly on said shaft while limiting said wheel hub to turn, and cushion spring elements between said wheel and said spider.

3. In a means of the character described, in combination, a driven shaft, a member having a hub fixedly attached thereto and having arms, a wheel having a hub concentrically mounted with respect to the driven shaft and relatively rotatable, flexible connections that join the said relatively rotatable wheel to the member attached to the shaft, other connections that join the hubs of said wheel and the said fixed member for holding the wheel up to the said member and limiting the free rotation of the wheel in either direction with respect to the said member and the shaft.

4. In a mechanism of the character stated, in combination, a driven shaft, a spider frame having a hub fixedly attached thereto, a wheel having a hub relatively rotatable with respect to the shaft and its attached spider frame, means passing through said hubs for holding the said wheel up to the spider frame and flexible connections that join with the spider frame and the wheel, the said connections consisting of cushioning springs joined at one end to the arms of the spider frame and at their other ends to the adjacent spokes of the wheel.

5. In a mechanism of the character stated, in combination, a driven shaft, a spider frame having a hub fixedly attached thereto, a wheel having a hub relatively rotatable with respect to the shaft and its attached spider frame, means passing through said hubs for holding the said wheel up to the spider frame and flexible connections that join with the spider frame and the wheel, the said connections consisting of cushioning springs joined at one end to the arms of the spider frame, and at their other ends to the adjacent spokes of the wheel, the said wheel spokes and the outer ends of the spider frame, being disposed in circumferential relation and having provision for securing and seating their respective adjacent ends of the springs.

6. In a mechanism of the character stated, in combination, a driven shaft, a spider frame fixedly attached thereto, a wheel relatively rotatable with respect to the shaft and its attached spider frame, means for holding the said wheel up to the spider frame and flexible clutch connections that join with the spider frame and the wheel, the said connections consisting of cushioning springs joined at one end to the arms of the spider frame, and at their other ends to the adjacent spokes of the wheel, the said wheel spokes and the outer ends of the spider frame, being disposed in circumferential relation and having provision for securing and seating their respective adjacent ends of the springs, the said means for holding the wheel up to the spider frame comprising bolts that pass through the hubs of the spider frame and the wheel, and are adapted to be made fast to the driving shaft, the bolt apertures in the hub of the wheel being circumferentially elongated whereby the wheel has a limited rotative motion relatively to the fastening bolts.

7. In a mechanism of the character stated, in combination, a driven shaft, a spider frame fixedly attached thereto, a wheel relatively rotatable with respect to the shaft and its attached spider frame, means for holding the said wheel up to the spider frame and flexible clutch connections that join with the spider frame and the wheel, the said connections consisting of cushioning springs joined at one end to the arms of the spider frame, and at their other ends to the adjacent spokes of the wheel, the said wheel spokes and the outer ends of the spider frame, being disposed in circumferential relation and having provision for securing and seating their respective adjacent ends of the springs, the said means for holding the wheel up to the spider frame comprising bolts that pass through the hubs of the spider frame and the wheel, and are adapted to be made fast to the driving shaft, the bolt apertures of the hub of the wheel being circumferentially elongated whereby the wheel has a limited rotative motion relatively to the fastening bolts, the shaft having an inner apertured flange for receiving the bolts, an apertured retaining or outer flange and bushings mounted within the circumferentially elongated apertures in the wheel hub through which the bolts pass, the said bushings being of slightly greater length than the thickness of the wheel hub whereby to serve as spacers for holding the wheel free from frictional contact with the spider frame and the outside or retaining flange.

8. In a mechanism of the character described, in combination, a driving shaft having an annular flange at one end, an inner member, the said member including a hub for engaging the flange of the shaft end, an outer member in the nature of a wheel having radial spokes and a hub, means for joining the said wheel and the spider frame in close relation and onto the shaft flange, the wheel being relatively rotatable with respect to the said joining means, the shaft and its attached spider frame, and coil springs that form cushioning clutch connections between the wheel and the spider frame and other means connecting the opposite ends of the springs with their respective adjacent pairs of spider frame arms and wheel spokes.

9. In combination with a shaft having a flange and a bearing surface adjacent thereto, a spider including a hub mounted on said surface adjacent to the flange, a wheel including a hub rotatable around the shaft adjacent to said spider, a member engaging said wheel hub at the side opposite to said spider hub, means for securing said member and said spider hub to said flange to hold said spider rigidly on said shaft while limiting said wheel hub to turn, cushion spring elements between said wheel and said spider, said last named means comprising bolts passing through said member, said wheel hub and said spider hub, said wheel hub having elongated bolt holes for allowing limited turning of said wheel.

ROY M. ROBINSON.
JAMES BRADLEY.